Feb. 24, 1970  F. E. WILEY ETAL  3,496,696
PACKAGE COMPRISING A VINYL CHLORIDE RESIN BASE AND A CRYSTALLINE
VINYLIDENE CHLORIDE FILM
Filed March 3, 1966

United States Patent Office 3,496,696
Patented Feb. 24, 1970

3,496,696
PACKAGE COMPRISING A VINYL CHLORIDE RESIN BASE AND A CRYSTALLINE VINYLIDENE CHLORIDE FILM
Floyd E. Wiley, Royersford, and Guy C. Tomme, Barto, Pa., assignors to The Firestone Tire & Rubber Company, Akron, Ohio, a corporation of Ohio
Filed Mar. 3, 1966, Ser. No. 531,606
Int. Cl. B65b 9/04
U.S. Cl. 53—28                                    1 Claim

ABSTRACT OF THE DISCLOSURE

A commodity is enclosed in a package comprising a rigid vinyl chloride resin base member carrying a commodity and a flexible crystalline vinylidene chloride film draped over the commodity and engaging the base member in faying relation. The faying surface is coated with an aqueous dispersion of a vinyl acetate polymer containing from 5 to 45% of a plasticizer, said dispersion, when partially or completely dried, exerting an aggresive adhesion action toward the vinylidene chloride film, notwithstanding the crystalline character of that film.

---

This invention relates to the adhesion of polyvinylidene chloride sheeting to substrates comprising vinyl chloride resins, and in particular, to the production of sealed packaging assemblies involving such adhesion.

Sheeting and film of vinylidene chloride resins are prospectively very attractive for packaging cover applications, having desirable transpiration characteristics, and being extensible so as to conform to the items to be packaged, strong and transparent, and presenting a sparkling appearance. Their adoption in certain applications has, however, been retarded because of the crystallizing tendencies of the vinylidene chloride resins, which renders it difficult to secure adhesion thereof to other components of packaging assemblies. In particular, it would be desirable to adhere vinylidene chloride windows or overwraps to jelly cups and the like make of rigid vinyl chloride sheeting. One rather elaborate and difficult approach to the problem has been to extrude the required vinylidene chloride film right at the point of use, and to assemble the packaged units immediately, securing the adhesion while the vinylidene chloride resin is still in the amorphous state, before it has had an opportunity to crystallize. This is, of course, inconvenient and adaptable only to packaging lines with large and steady production. Moreover the technique is rather unreliable because of the unpredictable crystallizing behavior of the polyvinylidene chloride film.

Accordingly it is an object of this invention to provide a novel, efficient and reliable method for the adhesion of vinylidene chloride resin film to substrates of rigid vinyl chloride resin.

Another object is to provide such a process which is capable of using ready-manufactured, crystalline vinylidene chloride film, without the necessity for extruding the film at the point of use.

A further object is to provide such a process wherein the adhesion may be effected by simple moderate pressure contact of the faying surfaces, without the necessity for heat-sealing shoes or the like.

A further object is to provide an adhesive which may be applied in liquid form to the faying surface of a rigid vinyl film, and which may be dried to an aggressively adhesive coating which will establish an adhesive bond with a vinylidene chloride film which is pressed into contact therewith.

The invention will be described in connection with the drawing, wherein.

SYNOPSIS OF THE INVENTION

Figure 1:
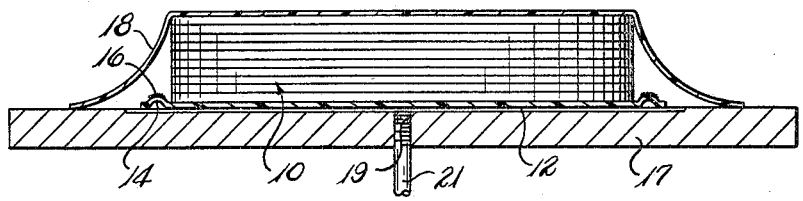
FIGS. 1–3 show successive stages in the assemblage and adhesive closure of a package involving stretch-conformation of a vinylidene chloride film in accordance with this invention.

The above and other objects are secured, in accordance with this invention, by the use of adhesives comprising aqueous dispersions of vinyl acetate polymers (or copolymers thereof with minor proportions of other unsaturated compounds copolymerizable therewith) said dispersions containing from about 5% to 45% based on the weight of the vinyl acetate polymer or copolymer, of a plasticizer for such polymer or copolymer. The dispersion is coated upon the faying surface of the rigid vinyl chloride substrate, and partially or completely dried, leaving a coating which is aggressively adhesive toward vinylidene chloride resin sheeting. The contents to be packaged, the rigid vinyl chloride substrate, and the vinylidene chloride resin sheeting are then assembled together, and the faying surfaces of the sheeting pressed against the adhesive coating, thereby effecting closure of the package. As an incident to this assembly operation, the vinylidene chloride sheeting may be stretched, as in a vacuum forming fixture, to conform to the article to be packaged, or to the contour of the substrate vinyl chloride resin. The adhesive bond so established, is strong, permanent, and reliable with standing flexure, shock and other abuse both at high and low temperatures.

THE VINYL ACETATE POLYMER OR COPOLYMER DISPERSION

These may be any aqueous latex-like dispersions of polymers of vinyl acetate, or copolymers therewith with minor proportions (say up to 35%) of other ethylenically unsaturated compounds copolymerizable therewith, such as acrylic and methacrylic esters on the order of methyl acrylate, ethyl acrylate, propyl acrylate, 2-ethyl hexyl acrylate, methyl methacrylate, acrylonitrile and the like, other vinyl esters and halides such as vinyl chloride, vinyl bromide, vinyl chloroacetate and the like; vinyl ethers and ketones such as vinyl ethyl ether, methyl isopropenyl ether, methyl isopropenyl ketone and the like and conjugated diolefins such as butadiene, isoprene, piperylene and the like. Particularly excellent copolymers for use in this invention are those made from vinyl acetate and methyl acrylate containing about 15–35% of methyl acrylate copolymerized therein. For a more complete listing of monomers suitable for copolymerization with vinyl acetate, reference is made to Krczil "Kurzes Handbuch der Polymerisationstechnik" volume II "Mehrstoff Polymerisation" page 732, the items indented under "vinylacetat." These copolymers are dispersed in water, the polymers and copolymers being present to the extent of from 20 to 60%, based on the total weight of the dispersion. Such dispersions are produced by processes well known in the art, typically by emulsifying the vinyl acetate and any comonomers in water, together with a free radical liberating catalyst, and adjusting the temperature to secure polymerization of the vinyl acetate.

THE PLASTICIZER

This may be any of the liquid plasticizers customarily used in vinyl acetate resins, such as (the preferred) diethyl phthalate, di(2-ethyl hexyl)phthalate, dibenzyl phthalate, tricresyl phosphate, and the like. Such plasticizers should be present to the extent of from 15 to 40%, based on the weight of the vinyl acetate polymer or copolymer in the adhesive. The plasticizers may be incorporated by gradually adding the same, with stirring, to a suitable vinyl acetate polymer or copolymer dispersion, with addition of supplemental emulsifying agents if this appears to be desirable for purposes of stability. It will often be advisable to dilute the dispersion with additional water to decrease the vicosity for convenient manipulation. In such cases it will be advisable to use distilled or deionized water to avoid the introduction of possibly interfering ionic materials.

THE VINYLIDENE CHLORIDE RESIN SHEETING

This may be any film which is made from a polymer of vinylidene chloride, or a copolymer thereof with minor proportions, say up to 35% based on the weight of such copolymers, with other ethylenically unsaturated compounds copolymerizable therewith such as vinyl halides and esters on the order of vinyl chloride, vinyl bromide, vinyl acetate, vinyl propionate, vinyl chloroacetate, and the like, acrylic and methacrylic esters such as methyl acrylate, ethyl acrylate, butyl acrylate, 2-ethyl hexyl acrylate, methyl methacrylate, butyl methacrylate, ethyl chloroacrylate, acrylonitrile, methacrylonitrile, and the like, maleic esters such as diethyl maleate, dibutyl maleate, di(2-ethyl hexyl) maleate, methyl butyl maleate, and the like, the conjugated diolefins such as butadiene, isoprene, piperylene, 2,3-dimethylbutadiene and the like; and vinyl ethers and ketones such as methyl vinyl ether, ethyl vinyl ether, methyl isopropenyl ketone and the like. For a more complete listing of compounds known to copolymerize with vinylidene chloride, reference is made to Krczil (supra) page 739, the items indented under "vinyliden chlorid." The sheeting employed in this invention will have been extruded, cast or calendered from vinylidene chloride resins such as described above, and need not be fresh—i.e., they may have become crystallized to a greater or lesser extent without impairing the affinity of the adhesive thereof. Commonly, the sheeting will be on the order of .003 to .01 inch in thickness, and will be susceptible of stretching so as to conform to the contours of the articles to be packaged and/or the outlines of the other components of the package assembly.

THE VINYL CHLORIDE SUBSTRATE

This will be a rigid, substantially unplasticized (say containing not more than about 15% of plasticizers based on the weight of the resin) vinyl chloride resin. Suitable vinyl chloride resins include, for instance, vinyl chloride homopolymers, and vinyl chloride copolymers containing up to 15%, based on the weight of coplymers, of ethylenically unsaturated compounds copolymerizable therewith, such as vinylidene chloride, vinyl esters such as vinyl acetate, vinyl propionate, vinyl stearate, vinyl chloroacetate and the like, acrylic compounds such as methyl acrylate, methyl methacrylate, ethyl acrylate, acrylonitrile, methacrylonitrile and the like, maleic and related esters such as dibutyl maleate, di(2-ethyl hexyl) maleate, dibutyl fumarate and the like, and vinyl ethers and ketones such as methyl vinyl ether, methyl vinyl ether, methyl isopropenyl ketone and the like. For a more complete listing of ethylenically unsaturated compounds known to be copolymerizable with vinyl chloride, reference is made to Krczil supra, pp. 735–737, the items indented under "vinyl chlorid." The vinyl chloride resin substrate is of a rigid type formulation, i.e., containing not more than 15% of a plasticizer for the resin. The substrate will usually be in sheet form, say .005–.05 inch thick, and will commonly be thermoformed to form part of a packaging assembly, as for instance boats, coasters or trays for meat, small tools or like objects or other commodities; drawn cups for containing jams, jellies, sauces, or the like; and so on.

EFFECTING THE ADHESION

In the carrying out of this invention, the vinyl acetate polymer or copolymer dispersion is coated upon the faying surfaces of the rigid vinyl chloride resin component, or of the vinylidene chloride resin component, or of both of the components. The coating is permitted to dry, and the faying surfaces are then pressed together. A strong and reliable adhesive bond is thereby established which will survive abuse such as the shock of repeated dropping of the assembly, both at high and at low temperatures. The pressing together of the faying surfaces may be accomplished manually, or by means of a presser foot or roller, or by means of differential fluid pressure. Heat may be applied to the faying areas, or one or both of the components may be preheated, but this is not necessary, as satisfactory adhesion can be obtained at room temperature. The vinylidene chloride resin sheeting may advantageously undergo stretch-forming during this operation, as by vacuum-forming the sheeting over a commodity to be packaged, the commodity being supported on a tray, coaster, or the like made from the rigid vinyl chloride composition.

With the foregoing general discussion in mind, there are given herewith detailed examples of the practice of this invention. All parts and percentages given are by weight, unless otherwise indicated.

SPECIFIC ADHESIVE COMPOSITIONS ACCORDING TO THIS INVENTION

A range of adhesive compositions for use in the invention were made up as follows:

Vinyl acetate resin dispersion, (nature and manufacture per Table I) part emulsion _____ 100
Water (distilled) parts _____ 22.7
Diethyl phthalate (per Table I) parts _____ 18–36

A series of adhesive compositions was made up in accordance with the foregoing recipe, varying the ingredients from one composition to another as set forth in Table I below. In each case the vinyl acetate resin dispersion was diluted with the water, and the diethyl phthalate added gradually with stirring. The resulting several dispersions were used in adhesive applications as described below.

TABLE I

| Vinyl Acetate Resin Dispersion | Parts of Diethyl Phthalate Used | Viscosity of Final Composition (cps.) |
| --- | --- | --- |
| "Gelva TS-100", an aqueous dispersion of a vinyl acetate/long-chain acrylate copolymer; 54.5% solids content, viscosity 1,000 cps. Manufactured by Shawinigan Resins Corporation. | 5 | 64 |
| | 8 | 95 |
| | 10 | 118 |
| | 18 | 202 |
| | 27 | 318 |
| | 36 | 469 |
| "Elvacet 1423", a polyvinyl acetate dispersion (55% solids) manufactured by E. I. duPont deNemours & Co. | 27 | |

Each of the above compositions performed satisfactorily in each of the applications described hereinbelow.

VACUUM STRETCH PACKAGING

Figure 2:
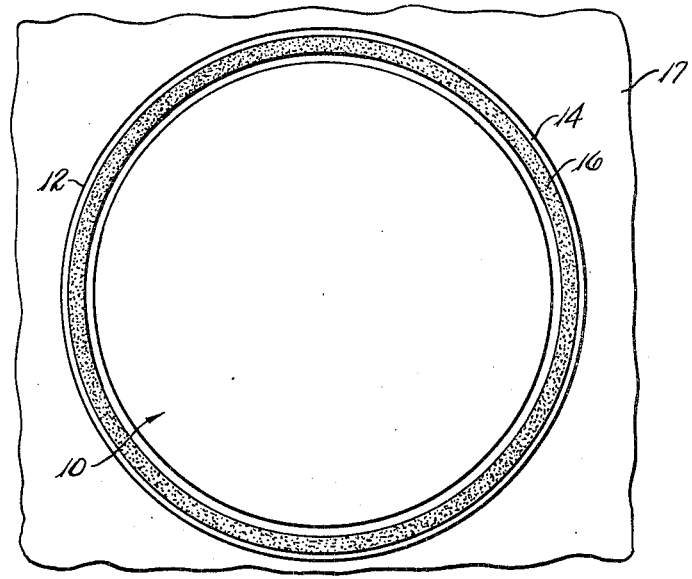
Figure 3:
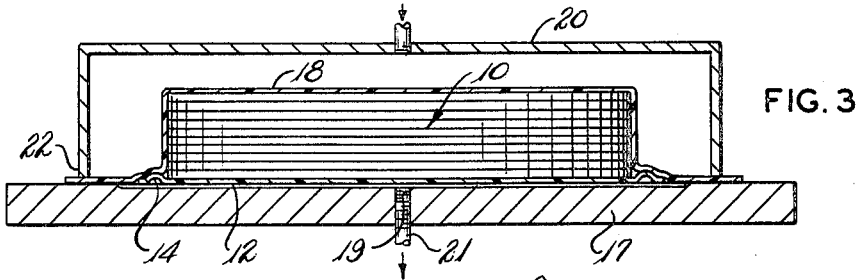
Figures 4, 5:
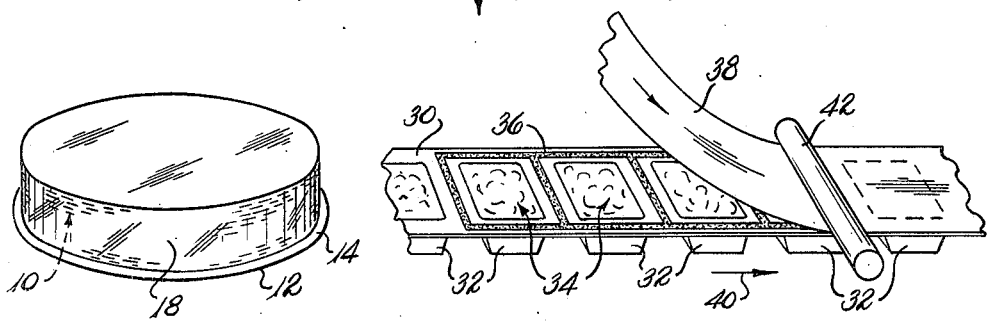
FIG. 4 is a perspective view of a finished package assembled in accordance with FIGS. 1 and 2.
FIG. 5 shows the assemblage of jelly-cup packages without substantial stretching of the polyvinylidene chloride film in accordance with this invention.

FIGS. 1–4 show the application of the adhesive of this invention to the vacuum stretch-packaging of sliced bologna sausage. As shown in FIG. 1, a stack of bologna slices 10 is placed upon a circular tray or coaster 12 of heat-stretch-formed rigid polyvinyl chloride sheeting. As shown in FIGS. 1 and 2, the tray 12 has a circular bead or ridge 14 formed around the periphery thereof, and a stripe 16 of the adhesive composition of the invention is coated upon the crest of the ridge 14 all around the tray, and permitted to dry. (Each of the adhesive compositions listed in Table I was used on an assembly in this manner.) The tray 12 rests upon a vacuum table 17 provided with a hole 19 connected to a vacuum line 21. A thin (.003") extensible film 18 of polyvinylidene chloride is draped over the stack 10 of slices. Thereafter (FIG. 3) a hold-down cap 20 is placed over the assembly, with its edges 22 pinning the film 18 down upon the table 17, and a vacuum is pulled via the line 21 and hole 19, drawing and stretching the film 18 down and around the stack 10 in close conformity thereto, and also drawing the film 18 down upon the bead or ridge 14 and adhesive stripe 16 thereon. The adhesive stripe 16 immediately and aggressively establised a firm adhesive bond between the film 18 and the bead 14 of the tray 12. The vacuum is released, the assembly is removed from the table 17, and excess film extending beyond the periphery of the tray 12 is trimmed away, leaving the finished package as shown in FIG. 4.

In order to test the excellence of the adhesive bonds in the assemblies, a series of packages produced with the use of each of the adhesives listed in Table I were stored in the freezing compartment of a domestic refrigerator for 24 hours. The packages were then removed and repeatedly dropped from a height of 6 feet onto a concrete floor. No failure of the adhesive bond was observed in any instance.

ADHESION BY MECHANICAL PRESSURE

FIG. 5 shows the assemblage of individual-portion jelly cups in accordance with this invention. There is shown a strip 30 of rigid vinyl chloride resin sheeting, having cups 32 drawn therein at spaced intervals, the cups being filled with jelly 34. The "land" surfaces of the upper side of the sheeting 30 surrounding the drawn cups 32 have a coating 36 of the adhesive of this invention coated thereon, and the strips 30, together with a covering strip 38 of vinylidene chloride film, is passed to the right as indicated by the arrow 40 under a roller 42 which presses the film 38 down upon the adhesive coating 36. An aggressive and durable bond is thereby established, and the strip 30 is severed between the cups 32 to produce sealed individual serving packages of jelly. These packages withstood, without failure of the adhesive, all of the usual handling vicissitudes ordinarily encountered by such packages.

From the foregoing general discussion and detailed description, it will be evident that this invention provides an efficient and inexpensive means for adhering vinylidene chloride and rigid vinyl chloride sheetings together. The materials employed are non-toxic, and adhesion is effected by simple mechanical pressure, without the need for heating appliances.

What is claimed is:
1. A process of forming a commodity package assembly which comprises providing:
 (I) a first enclosing member formed from a sheet of rigid vinyl chloride resin composition,
 (II) a second enclosing member of a sheet of crystallized vinylidene chloride resin, and
 (III) a commodity;
 (IV) an aqueous dispersion containing

|  | Parts by weight |
|---|---|
| (A) A vinyl acetate resin | 100 |
| plus | |
| (B) A plasticiser for said vinyl acetate resin | 5–40 | depositing the aqueous dispersion (IV) upon a surface of said first enclosing member (I), drying said dispersion (IV) to provide an aggressive adhesive stratum, enclosing said commodity (III) between said members (I) and (II) and drawing the members (I) and (II) together into adhesive engagement at said adhesive stratum.

References Cited
UNITED STATES PATENTS

| 2,677,672 | 5/1954 | Luce | 260—8 |
| 2,799,589 | 7/1957 | Grinstead et al. | 99—174 |
| 3,229,810 | 1/1966 | Goller et al. | 99—174 |
| 3,131,069 | 4/1964 | Goller et al. | 99—174 |

A. LOUIS MONACELL, Primary Examiner

R. B. ANDEWELT, Assistant Examiner

U.S. Cl. X.R.
99—171, 174